(12) United States Patent
Carreiro et al.

(10) Patent No.: US 7,209,240 B1
(45) Date of Patent: *Apr. 24, 2007

(54) SYSTEM AND APPARATUS FOR MEASURING DISPLACEMENTS IN ELECTRO-ACTIVE MATERIALS

(75) Inventors: Louis G. Carreiro, Westport, MA (US); Lawrence J. Reinhart, Wilmington, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 385 days.

This patent is subject to a terminal disclaimer.

(21) Appl. No.: 10/914,777

(22) Filed: Aug. 5, 2004

(51) Int. Cl.
*G01B 11/02* (2006.01)
*G01B 13/08* (2006.01)
*G01B 7/16* (2006.01)
*G01N 33/00* (2006.01)

(52) U.S. Cl. .................. 356/498; 73/37.5; 73/763; 73/866

(58) Field of Classification Search ........ 356/485–487, 356/492, 493, 496, 498; 73/37.5, 763, 800, 73/866
See application file for complete search history.

(56) References Cited

U.S. PATENT DOCUMENTS

| | | | |
|---|---|---|---|
| 3,938,889 A * | 2/1976 | McKinnis | 356/498 |
| 4,436,419 A * | 3/1984 | Stetson et al. | 356/486 |
| 4,572,670 A * | 2/1986 | Fredrickson | 356/496 |
| 4,678,905 A * | 7/1987 | Phillips | 250/227.21 |
| 4,897,541 A * | 1/1990 | Phillips | 250/227.21 |
| 5,381,299 A * | 1/1995 | Provenzano et al. | 73/718 |
| 5,446,546 A | 8/1995 | Breidenbach et al. | |
| 5,633,467 A | 5/1997 | Paulson | |
| 5,915,267 A * | 6/1999 | Kim | 73/1.15 |
| 6,053,035 A | 4/2000 | Nomura et al. | |
| 6,457,359 B1 | 10/2002 | Suzuki | |
| 6,563,570 B1 | 5/2003 | Okada | |
| 6,584,857 B1 | 7/2003 | Furlani et al. | |
| 6,604,266 B1 * | 8/2003 | Tajima et al. | 29/25.35 |
| 6,637,265 B1 * | 10/2003 | Hay et al. | 73/433 |
| 6,718,832 B1 * | 4/2004 | Hay et al. | 73/790 |
| 6,860,136 B1 * | 3/2005 | Hay et al. | 73/1.01 |

* cited by examiner

Primary Examiner—Gregory J. Toatley, Jr.
Assistant Examiner—Patrick Connolly
(74) Attorney, Agent, or Firm—James M. Kasischke; Jean-Paul A. Nasser; Michael P. Stanley

(57) ABSTRACT

A specialized containment cell with optically transparent apertures, in conjunction with a laser interferometer system provides the means for non-contact displacement measurements of electro-active (piezoelectric and electrostrictive) materials to be performed under controlled conditions of pressure, temperature and applied voltage. A sample of electro-active material is placed inside the cell. Electrical connections are made from a high voltage power source to the sample through the cell. Thermoelectric heaters/coolers and a cooling water heat sink built into the cell control the temperature of the sample. The cell is flooded with a dielectric oil pressurizing the interior of the cell to a desired pressure. The cell is optically aligned to the interferometer, and with the cell heated to the proper temperature, a voltage is applied to the sample as the interferometer measures the displacement of the sample.

15 Claims, 5 Drawing Sheets

SYSTEM AND APPARATUS FOR MEASURING DISPLACEMENTS IN ELECTRO-ACTIVE MATERIALS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

This patent application Ser. No. 10/914,776 is co-pending with a related patent application entitled A SYSTEM AND APPARATUS FOR MEASURING DISPLACEMENTS IN ELECTRO-ACTIVE MATERIALS (Navy Case No. 84273), by Louis G. Carreiro and Lawrence J. Reinhart both of whom are inventors as to this application.

BACKGROUND OF THE INVENTION (1) Field of the Invention

The present invention relates to a device for measuring displacements in a solid material, and more specifically to a device for applying uniaxial hydraulic pressure to the surfaces of an electro-active material while at the same time permitting a light source to be focused on the same surfaces in order to perform non-contact displacement measurements of the material under controlled conditions of pressure, temperature and applied voltage.

(2) Description of the Prior Art

The active elements of most sonar transducers consist of rings, disks or plates fabricated with electro-active (piezoelectric and electrostrictive) ceramics such as lead zirconium titanate (PZT) and with emerging materials such as the solid solution of lead magnesium niobate and lead titanate (PMN-PT). In a common configuration, these elements are bonded together with epoxy to form a stack that is then placed under a compressive load. When the stack is electrically driven, the applied compressive force opposes the tensile stress (internal strain) generated in the ceramic. This arrangement prevents the ceramic from going into tension and thus reduces the chance of failure due to fracturing.

Attempts to measure the electromechanical properties of stack elements often result in data that is difficult to interpret since the epoxy adhesive, metal electrodes and compression fixture tend to mask the properties of the ceramic. Therefore, a device for the direct characterization of the pre-stressed ceramic that eliminates the unwanted contributions from the stack assembly components is needed.

Currently, there exists a quasi-static apparatus used to determine the 33-mode properties of electro-active ceramics under simultaneous conditions of high electrical drive, electrical bias, compressive load and temperature.

With the quasi-static apparatus, a sample with dimensions of 2 mm×2 mm×10 mm (an aspect ratio of 5:1 ensures 33-mode operation) is placed under a unidirectional compressive load along its length. The pre-stress is applied over a range of 0 to 10 ksi with a pneumatic piston designed to have low mechanical loss and low ac stiffness so that a "constant stress" boundary condition is met. The entire apparatus is placed in an environmental chamber in order to obtain data versus temperature. The sample is then electrically driven with a 10 Hz sine wave of the order of 2.0 Mv/m. The charge versus applied field is measured using an integrating capacitor, and the longitudinal strain versus field is measured with strain gauges attached to the sides of the sample. From these measurements, the large signal dielectric constant, $\in_{33}^{T}$, the piezoelectric constant $d_{33}$, and the coupling factor, $k_{33}$, can be calculated as a function of drive signal, bias field, pre-stress and temperature. Young's modulus is obtained from the measurement of strain versus applied stress.

The device described above has several limitations. The required geometry and small sample size often cause problems with mechanical alignment, and under compressive load, samples are prone to mechanical cracking and electrical breakdown. Precise attachment of the strain gauges to the samples is difficult, affecting the reproducibility of the measurements from sample to sample. Furthermore, the gauges introduce stray capacitance, and due to their close proximity, exhibit electrical cross talk and promote electrical discharge arcing. Since temperature is controlled via an environmental chamber, long equilibration times are required before data can be acquired. In addition, temperature gradients within the chamber also affect the ability to repeat the measurements. For the most part, this apparatus lacks the reliability and precision that is necessary to characterize electro-active ceramics in a reproducible and efficient manner. What is needed is a device for applying uniaxial hydraulic pressure to the surface of an electro-active material while at the same time performing non-contact displacement measurements of the material under controlled conditions of pressure, temperature and applied voltage.

SUMMARY OF THE INVENTION

It is a general purpose and object of the present invention to provide a means of measuring displacement in electro-active material under applied voltage through the application of a uniaxial constant force without the use of strain gauges.

It is a further object to provide a means of measuring displacement in electro-active material through a non-contact means such as laser interferometry.

Another object is to provide a means for measuring displacement in electro-active material that will not subject samples of the material to mechanical fracturing and electrical breakdown.

Another object is to provide a means for measuring displacement in electro-active material without the use of an environmental chamber.

Another object is to provide a means for measuring displacement in electro-active material on more than one side of the material.

Still another object is to provide a means for measuring displacement in electro-active material that will ensure reproducibility of the measurements from sample to sample.

These objects are accomplished with the present invention through a high pressure optical cell, in conjunction with a laser interferometer system. The cell provides a means for non-contact displacement measurements of electro-active (piezoelectric and electrostrictive) materials to be performed under controlled conditions of pressure, temperature and applied voltage.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
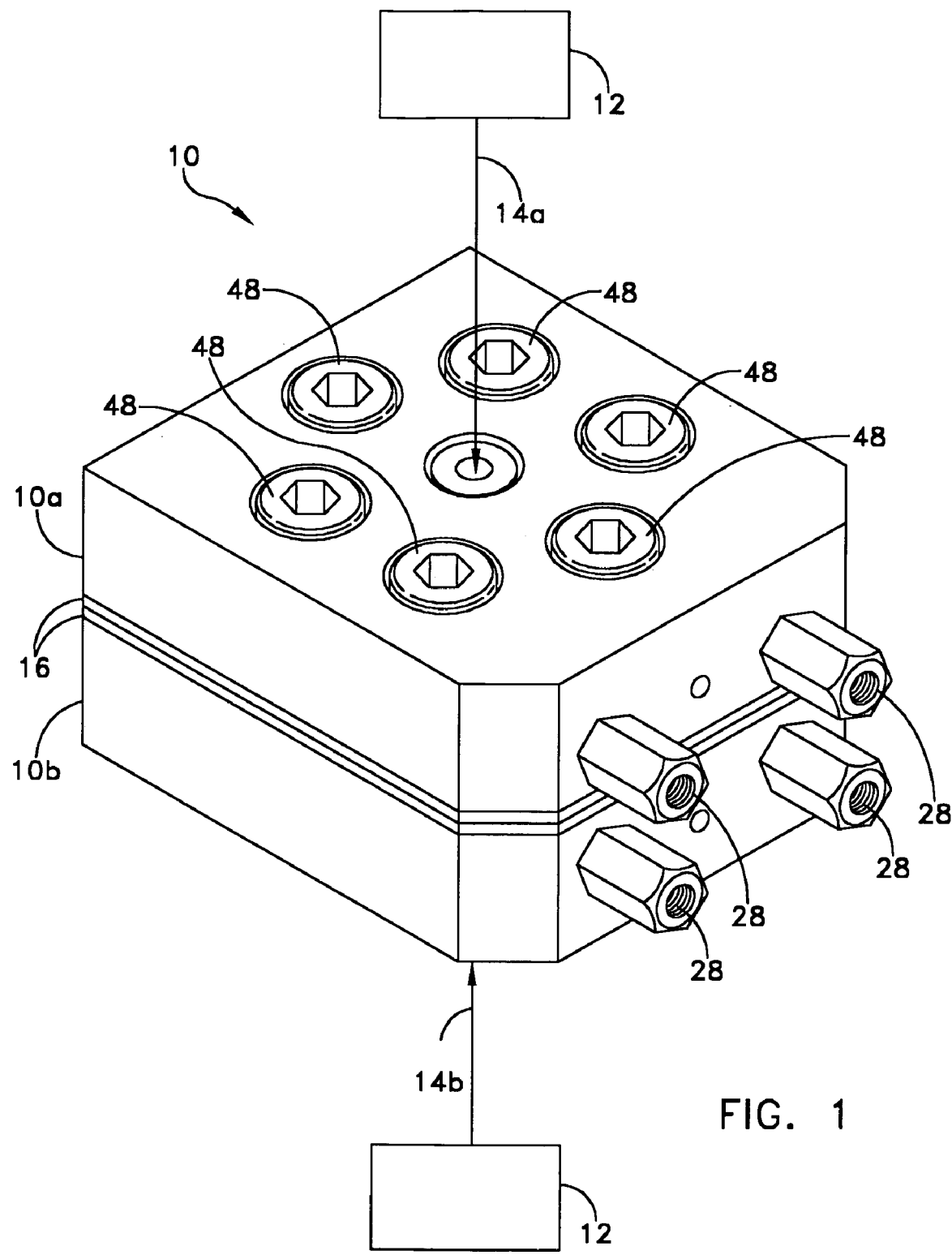
FIG. 1 shows a schematic drawing of the high pressure optical cell in use with the cell halves closed.
Figure 2:
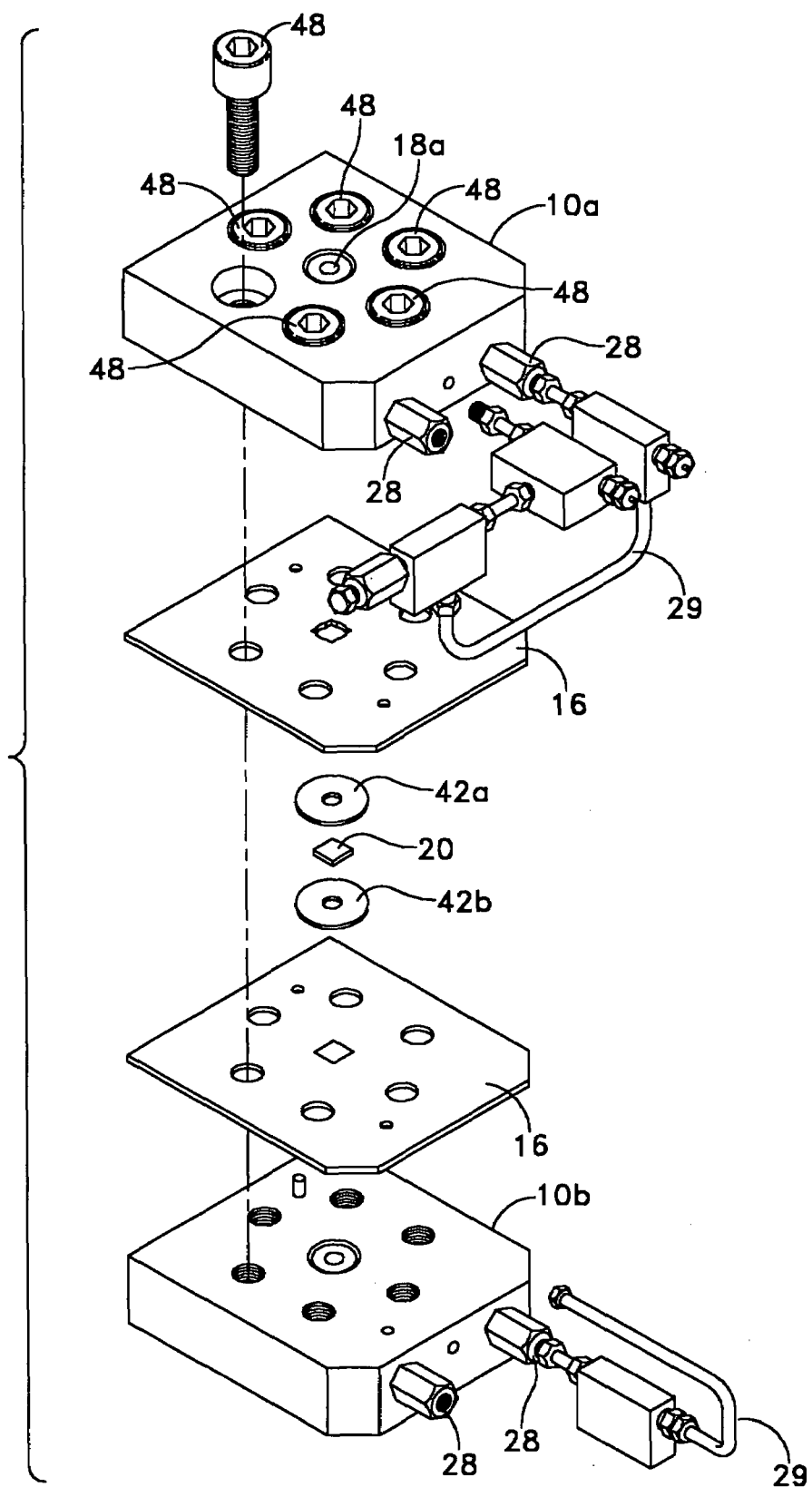
FIG. 2 shows a schematic drawing of the high pressure optical cell in use with the cell halves opened.

Referring now to FIG. 1 there is shown a high pressure optical cell 10. In the preferred embodiment, the cell 10 consists of two symmetrical cell halves, 10a and 10b. The cell 10 is fabricated from stainless steel, however, it is to be understood that the present device is not limited to that particular metal alloy and could be made of titanium or other materials capable of containing fluid at high pressures. Referring now to FIG. 2, there is shown the constituent components of the cell 10 designed to contain a sample 20 of electro-active material for displacement measurement in conjunction with laser interferometer 12. In the preferred embodiment, the cell 10 accommodates a sample 20 with cross-sectional areas of 0.25 to 1.0 in$^2$ and thickness of 0.1 to 0.25 inches. The two halves of the cell 10a and 10b are kept closed by bolts 48 that are tightened at a specified torque. The cell 10 is mounted onto a three-way high precision optical stage (not shown), with tilt and yaw capability, which is positioned in the beam path of the laser interferometer 12. This embodiment is based on an interferometer 12 configured for two beams 14a, 14b. Dual-beam interferometric measurements in which a first beam 14a reflects off one surface of sample 20 and a second beam 14b reflects off the opposite surface of sample 20 at the same position and axial point spatially as the first beam 14a provides a method for probing the symmetry of the displacement of sample 20.

Figure 3:
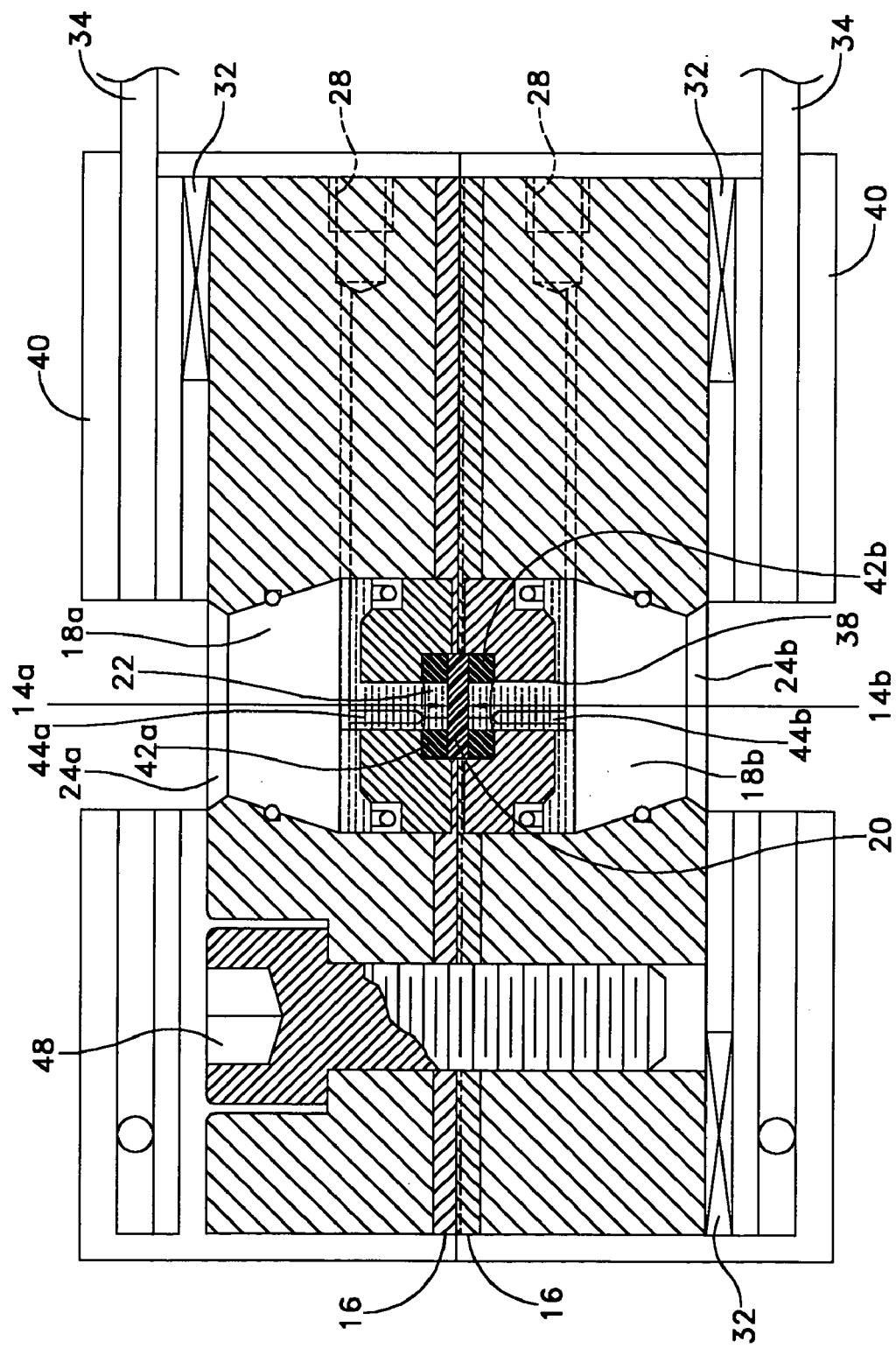
FIG. 3 shows a cross section of the high pressure optical cell containing the sample and dielectric oil.
Figure 4:
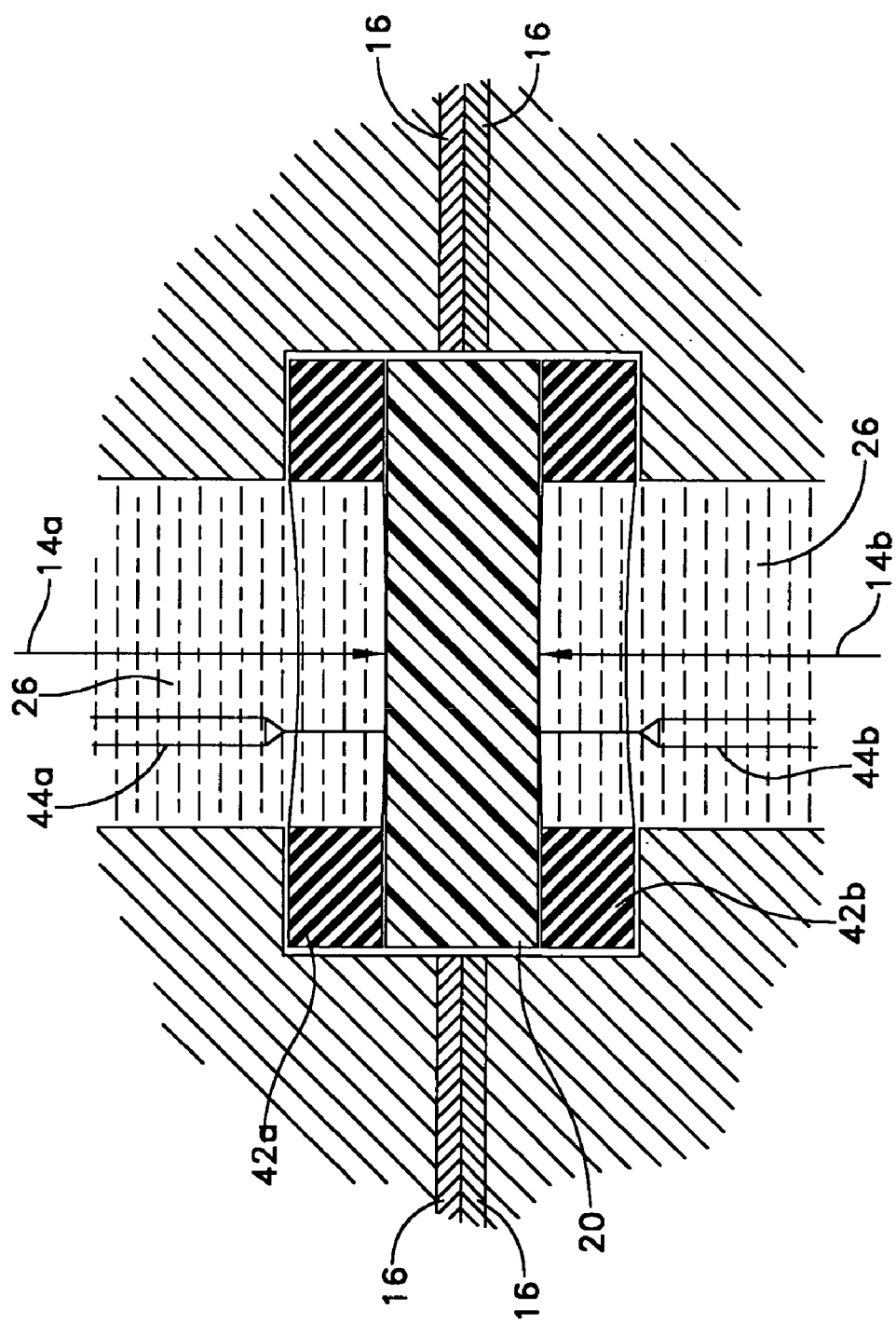
FIG. 4 shows a cross section close-up of the chamber of the high pressure optical cell.

Referring now to FIG. 3 and FIG. 4, it is shown that when the symmetrical cell halves 10a and 10b are closed and bolted, the cell 10 forms an interior cavity 22. Two quartz glass windows 18a and 18b are contained at opposite sides of the cavity 22, one in each of the respective cell halves 10a and 10b. The windows 18a and 18b are designed to be transparent to laser radiation of a particular wavelength. In the preferred embodiment, the wavelength is $\lambda$=632 nm, but is not limited as such. It should be understood that the present device is not limited to the use of quartz glass for the windows 18a, 18b and could be made of other optically transparent materials, providing said materials are transparent to the laser radiation in use. The windows 18a, 18b have an anti-reflective coating 24a and 24b on each of their respective surfaces transparent to light of the same wavelength as the laser beams 14a, 14b to prevent multiple reflections in the cavity 22 that might give rise to false signals to the interferometer 12.

Shim stops 16 are positioned between the two cell halves 10a and 10b that match various sample thickness in order to prevent crushing of the sample 20 when the cell halves 10a and 10b are in a closed position. The sample 20 is positioned within the cavity 22 between two piston seals 42a and 42b.

In the preferred embodiment, the seals 42a, 42b are made of glass-filled Teflon®. The piston seals 42a, 42b are designed to be interchangeable to match a given size and shape of sample 20, thus insuring a proper seal contact to minimize edge effects.

Once the sample 20 is properly placed within the cell 10 at the center of cavity 22, the cavity 22 is then filled with a high dielectric oil 26 with matching index of refraction ($\eta$=1.458) to that of the quartz windows 18a and 18b. The high dielectric oil 26 is introduced into the cavity 22 through the liquid pressure inlet/outlet ports 28 on each half of the cell 10 from a pressure pump control system 30 that generates and controls the hydraulic pressure. In the preferred embodiment, the pressure pump control system 30 is capable of generating up to 60 ksi of pressure. Once the cavity 22 is filled with oil 26 at a specified pressure, both surfaces of the sample 20 are subjected to a uniform uniaxial pressure leaving the outer perimeter surfaces of the sample 20 at room pressure.

Figure 5:
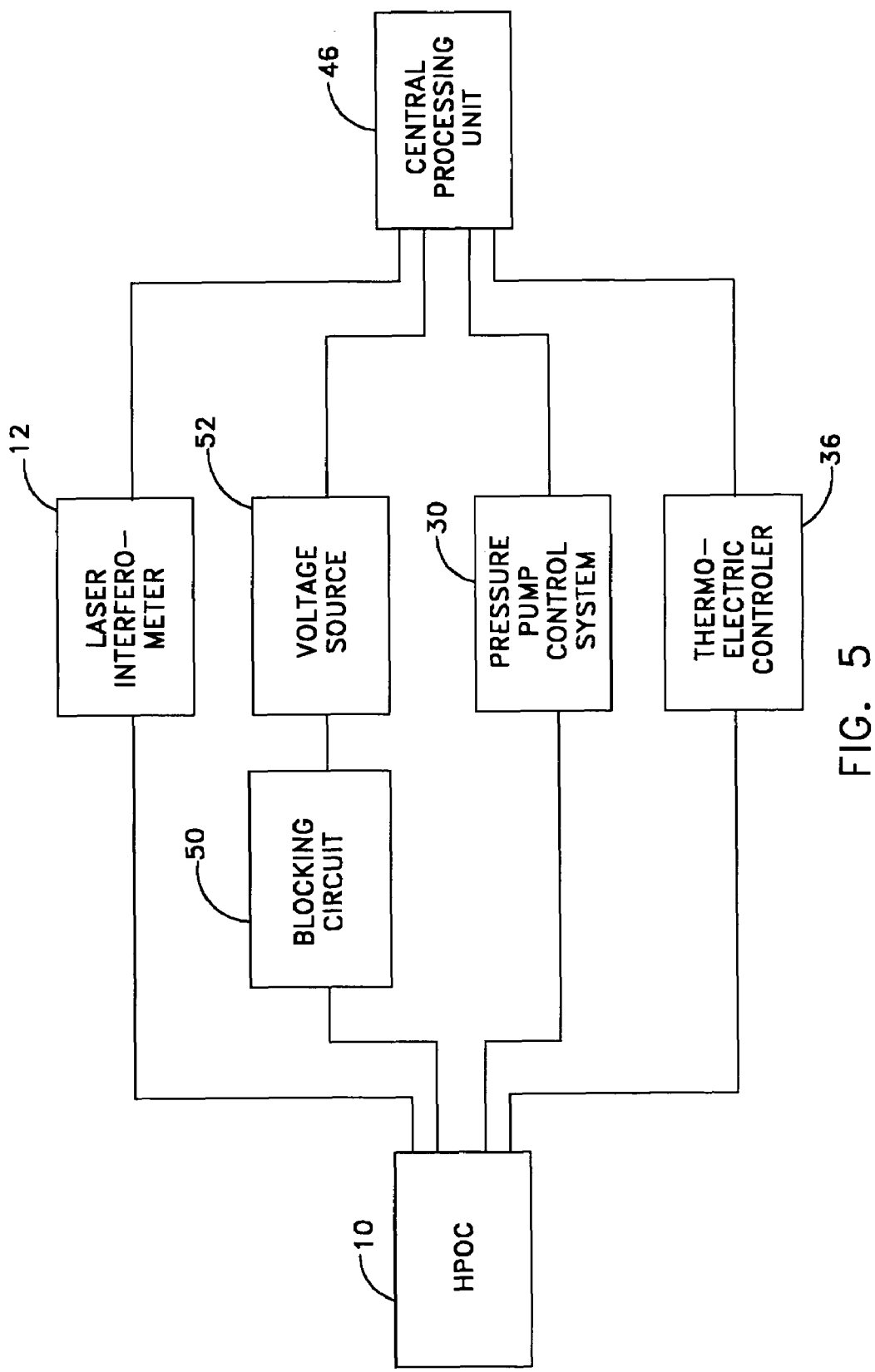
FIG. 5 shows a block diagram of the connections between the various components in the system controlled by a central processing unit.

Referring now to FIG. 3, FIG. 4 and FIG. 5, it is shown that thermoelectric coolers/heaters 32 are mounted onto the cell housing surrounding the cavity 22 to provide precise control of the temperature of both the dielectric oil 26 and the sample 20. A cooling water heat sink 34 is used to remove heat generated by the thermoelectric coolers/heaters 32. A thermoelectric controller 36 is used in conjunction with thermistors 38 to achieve accurate temperature control. A surrounding layer of insulation 40 assists in maintaining constant temperature conditions. The combination of thermoelectric coolers/heaters 32, cooling water heat sink 34, insulation 40, thermistors 38 and thermoelectric controller 36 allow the cell 10 to function as a miniature self-contained thermal control system.

Tension-spring wires 44a and 44b located in either side of cavity 22 make electrical contact with the sample 20, eliminating the need for solder connections to the test sample. The ends of the wire 44a and 44b that make electrical contact with the sample 20 are gold-plated and interchangeable. The contact heads can be pointed, flat, rounded or whatever geometry is required to insure a positive, continuous electrical contact to the sample. The other end of the wires 44a and 44b are electrically connected to a blocking circuit 50 and a high voltage power supply 52.

Referring now to FIG. 5, the cell 10, interferometer 12, thermoelectric controller 36, blocking circuit 50, voltage power supply 52 and pressure pump control system 30 are interfaced to a central processing unit 46 such as a computer that controls and monitors system components and experimental parameters.

In operation, the entire system functions as follows: The sample 20 is placed between piston seals 42a and 42b and positioned between the two cell halves 10a and 10b. The cell halves 10a and 10b are aligned and bolted. The electrical connections are made from the cell 10 to the blocking circuit 50 and high voltage power supply 52 via the tension spring wires 44a and 44b. Thermoelectric heaters/coolers 32 along with thermistors 38 are connected to the thermoelectric controller 39. Cooling water is connected to the cooling water heat sink 34. Pressure lines 29 are attached from the pressure pump control system 30 to the liquid pressure inlet/outlet ports 28, and the cavity 22 is flooded with the high-dielectric oil 26 while allowing air to bleed from the cavity 22. The cavity 22 is pressurized to the desired level and the cell 10 is optically aligned to the interferometer 12. Finally, the cell 10 is heated to the proper temperature and a voltage is applied to the sample 20 as the interferometer 12 measures the displacement of the sample 20.

This invention has several distinct advantages over the prior art. The present invention utilizes a non-contact method that measures strain via a laser interferometer, unlike the prior art methods that employs strain gauges physically attached to the sample. Use of a laser interferometer allows measurements to be performed with nanometer resolution.

Unidirectional pre-stresses of up to 20 ksi are applied using hydraulic fluid rather than mechanical compression. Since the ends of the sample are not clamped (between the platens of a press) they are free to move, eliminating the need for geometries with fixed aspect ratios. The present invention offers a variable frequency range of 1.0 Hz to 20 kHz and is not limited to a single operating frequency.

Temperature of the sample is precisely controlled with thermoelectric heaters and coolers, and is accurately monitored by thermistors placed in close proximity to the sample. The precision afforded by the thermal control elements built directly into the cell 10 provides an accuracy in temperature and speed of use that would otherwise be impossible to attain through the use of an environmental chamber.

Measurement of 31-mode properties (in addition to 33-mode) is possible. Double-sided measurements can be carried out to determine displacement symmetries on both faces of the sample simultaneously. Since the laser beam can be positioned anywhere on the surface of the sample, homogeneity of the surface can be evaluated.

What has thus been described is a device for applying uniaxial hydraulic pressure to the surfaces of an electroactive material while at the same time permitting a light source to be focused on the same surfaces in order to perform non-contact displacement measurements of the material under controlled conditions of pressure, temperature and applied voltage.

Obviously many modifications and variations of the present invention may become apparent in light of the above teachings. For example the cell may be made of various materials capable of withstanding high pressures. The dielectric fluid can be chosen from any of a number of fluids. The optical aperture may be made of any suitable optically transparent material. The laser frequency of the interferometer can vary according to the type of measurements taken.

In light of the above, it is therefore understood that within the scope of the appended claims, the invention may be practiced otherwise than as specifically described.

What is claimed is:

1. An apparatus for measuring displacements in a specimen of a solid material, comprising:
   a means for applying controlled uniaxial pressure to at least two surfaces of the specimen of said solid material;
   a means for applying controlled thermal energy to said specimen;
   a means for applying an electric field to said specimen; and
   a means for applying radiant light to at least two surfaces of said specimen to measure the displacement of said surface upon the application of said electric field.

2. An apparatus according to claim 1 wherein said means for applying controlled pressure to at least two surfaces of the specimen of said material further comprises:
   a housing surrounding a cavity in which said specimen is placed;
   a dielectric fluid hermetically contained at a variable pressure within said cavity, said dielectric fluid surrounding said specimen; and
   a means for controllably maintaining said cavity with a desired pressure of said dielectric fluid.

3. An apparatus according to claim 2 wherein said means for controllably maintaining said cavity with a desired pressure of said dielectric fluid comprises a hydraulic pump.

4. An apparatus according to claim 2 wherein said means for applying controlled thermal energy to said specimen comprises:
   at least one thermoelectric heater joined to said housing;
   at least one thermistor joined to said housing;
   at least one cooling coil joined to said housing, said cooling coil containing a coolant; and
   at least one layer of insulation disposed about said housing.

5. An apparatus according to claim 1 wherein said means for applying an electric field to said specimen further comprises:
   a high-voltage power supply; and
   a plurality of wire leads capable of conducting electric current in electrical contact with said specimen and connected to said high-voltage power supply.

6. An apparatus according to claim 5 wherein said plurality of wire leads are spring loaded wires with removable gold tips.

7. An apparatus according to claim 1 wherein said means for applying radiant light to at least two surfaces of said specimen to measure the displacement of the surfaces upon the application of said electric field comprises a laser interferometer directing at least one laser beam to each of the at least two surfaces of the specimen.

8. An apparatus for measuring displacements in a specimen of a solid material, comprising:
   a housing surrounding a cavity in which the specimen of said material is placed;
   a dielectric fluid hermetically contained at a variable pressure within said cavity;
   a means for controllably maintaining said cavity with a desired pressure of said dielectric fluid;
   a plurality of wire leads capable of conducting electric current in electrical contact with said specimen and connected to a high-voltage power supply for applying an electric field to said specimen;
   a means for applying controlled thermal energy to said specimen; and
   at least two apertures within said housing transparent to light to allow at least one laser beam from a laser interferometer to be directed to each of at least two surfaces of said specimen to measure the displacement of each said surface upon the application of an electric field to said specimen.

9. An apparatus according to claim 8 wherein said at least two apertures within said housing transparent to light are quartz windows.

10. An apparatus according to claim 9 wherein said quartz windows have an anti-reflecting coating.

11. An apparatus according to claim 9 wherein said quartz windows have the same index of refraction as said dielectric fluid.

12. An apparatus according to claim 8 wherein said housing is comprised of two symmetrical halves capable of being joined together into said housing.

13. An apparatus according to claim 8 wherein said means for controllably maintaining said cavity with a desired pressure of said dielectric fluid comprises a hydraulic pump.

14. An apparatus according to claim 8 wherein said means for applying controlled thermal energy to said specimen comprises:
   at least one thermoelectric heater joined to said housing;
   at least one thermistor joined to said housing;

at least one cooling coil joined to said housing, said cooling coil containing a coolant; and at least one layer of insulation disposed about said housing.

15. An apparatus according to claim 8 wherein said solid material is an electro-active material.

* * * * *